(12) United States Patent
Geier et al.

(10) Patent No.: US 12,038,803 B2
(45) Date of Patent: Jul. 16, 2024

(54) OPTIMIZED LIBRARY SOLUTION FOR DENTAL IMPLANTS

(71) Applicant: BIOMET 3I, LLC, Palm Beach Gardens, FL (US)

(72) Inventors: Andreas Geier, Gargazon (IT); Zachary B. Suttin, Jupiter, FL (US)

(73) Assignee: BIOMET 3I, LLC, Palm Beach Gardens, FL (US)

( * ) Notice: Subject to any disclaimer, the term of this patent is extended or adjusted under 35 U.S.C. 154(b) by 538 days.

(21) Appl. No.: 16/829,415

(22) Filed: Mar. 25, 2020

(65) Prior Publication Data

US 2020/0306018 A1 Oct. 1, 2020

Related U.S. Application Data

(60) Provisional application No. 62/826,451, filed on Mar. 29, 2019.

(51) Int. Cl.
| | |
|---|---|
| *A61C 13/00* | (2006.01) |
| *A61C 13/34* | (2006.01) |
| *B33Y 50/02* | (2015.01) |
| *B33Y 80/00* | (2015.01) |
| *G06F 11/07* | (2006.01) |

(52) U.S. Cl.
CPC ...... *G06F 11/0793* (2013.01); *A61C 13/0004* (2013.01); *A61C 13/0019* (2013.01); *A61C 13/34* (2013.01); *G06F 11/0745* (2013.01); *G06F 11/0751* (2013.01); *G06F 11/0772* (2013.01); *B33Y 50/02* (2014.12); *B33Y 80/00* (2014.12)

(58) Field of Classification Search
CPC ............ G06F 11/0793; G06F 11/0745; G06F 11/0751; G06F 11/0772; A61C 13/0004; A61C 13/0019; A61C 13/34; B33Y 50/02; B33Y 80/00

See application file for complete search history.

(56) References Cited

U.S. PATENT DOCUMENTS

| | | | |
|---|---|---|---|
| 8,100,692 B2 * | 1/2012 | Diangelo | A61C 8/0001 433/213 |
| 8,185,224 B2 | 5/2012 | Powell et al. | |

* cited by examiner

*Primary Examiner* — Rick K Chang
(74) *Attorney, Agent, or Firm* — Sheridan Ross P.C.

(57) ABSTRACT

Systems and methods are described herein for fitting of a dental analog. In an embodiment, a test block may be printed that includes a number of analog pockets of different sizes. A dental analog may be tested within the analog pockets to determine which analog pocket provides the best fit. Once the best fitting analog pocket is identified, a corresponding library file describing the geometry of that analog pocket is identified, and a dental prototype model may be 3D-printed using analog pocket geometry based on the analog library file. By printing using common printing parameters and the identified analog library file, the resulting printed dental prototype provides the same fit as the analog pocket identified within the test block. This use of a test block reduces or eliminates the need for iterative cycles of printing and testing multiple printed dental prototypes.

18 Claims, 5 Drawing Sheets

OPTIMIZED LIBRARY SOLUTION FOR DENTAL IMPLANTS

FIELD

The present application relates to 3D printing of dental models for dental implants.

BACKGROUND

Digital dentistry has been developed to help dentists and dental assistants in performing dental procedures. Digital dentistry may include computer-aided dentistry, which may be used to design dental implants, dental implant restorations, dental implant models, surgical guides, and other dental procedure devices. An example of computer-aided dentistry is U.S. Pat. No. 8,185,224, which describes manufacturing dental implant components using scanning and computer-aided design.

One form of computer-aided dentistry includes manufacturing of a dental implant replica, which may be referred to as a dental analog. As used herein, a dental analog includes a dental implant replica that can be used in a physical dental model for a patient. The dental analog may be used to replicate the position and orientation of the implant in the patient's mouth, to develop the dental implant restoration, or for other dental procedures. A dental analog may contain the same connection (e.g., screw, bolt, or another fastening device) as the dental implant, but may not require the same macrogeometry or surface technology as the dental implant because the dental analog is not being fixed to (e.g., screwed into) the jaw of the patient.

The use of dental analogs may include making a digital model of a jaw of a patient, and the model may be 3D-printed to perform fitting of a dental analog, to build a crown, to build a bridge, or to simulate other dental procedures. When used in combination with digitally rendered 3D-printed prototype models of a patient jaw, the dental analog may be referred to as a digital analog. The digital analog behaves as a proxy for the dental implant within the printed dental model. When used with a printed dental model, the exterior of the dental analog will include features related to the position (e.g., x, y, z position) of the analog connection so that a mating pocket may be placed into the model, which enables controlling of the position of the analog and in turn the analog connection within the printed dental model.

Unfortunately, there is considerable variability amongst 3D-printed prototype models due to variations in the 3D printers, the resins used with these 3D printers, variations in the calibration settings of these printers, variations in how the models are cleaned or post-processed once they are removed from these printers, and other variations. The potential for variations with 3D-printed prototype models is increasing with the increasing number of types of 3D printers and new 3D printing resins. The variability among 3D-printed prototype models leads to variability in fitting of a dental analog and other dental procedures, and may reduce the accuracy of the devices that are made from these models. When a fitting of a dental analog indicates an imperfect match between the dental analog and the 3D-printed prototype, it often requires that a new prototype is printed using different parameters, such as a modified analog model, a different resin, a different 3D printing technique, a different 3D printer, or other changes. Due to the precision required for 3D-printed prototype models of a patient jaw, each 3D prototype may take several hours to print. If the next fitting of the dental analog indicates an imperfect match between the dental analog and the new printed prototype, then another prototype may need to be printed. This cycle may need to be iterated repeatedly until the correct combination of parameters is identified. What is needed is an improved method for fitting of a dental analog.

DETAILED DESCRIPTION

The present disclosure describes technical solutions to various technical problems facing fitting of a dental analog. In an embodiment, a test block may be printed that includes a number of analog pockets of different sizes. A dental analog may be tested within the analog pockets to determine which analog pocket provides the best fit. Once the best fitting analog pocket is identified, a corresponding ideal library file or computer-aided design (CAD) file describing the geometry of that analog pocket is identified, and a dental prototype may be 3D-printed based on the ideal analog library file. The dental prototype model and test block may be printed using the printing parameters that are typically used by a dental laboratory that prints dental models or other devices, where the printing parameters may include using a common 3D printer, 3D printer settings, and resin. By printing using common printing parameters and the identified ideal analog library file, the subsequent dental prototype models will result in a fit between the analog and the model which is the same as the analog pocket identified with the best fit within the test block. This use of a test block reduces or eliminates the need for iterative cycles of printing and testing multiple printed dental prototypes.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

Figure 1A:
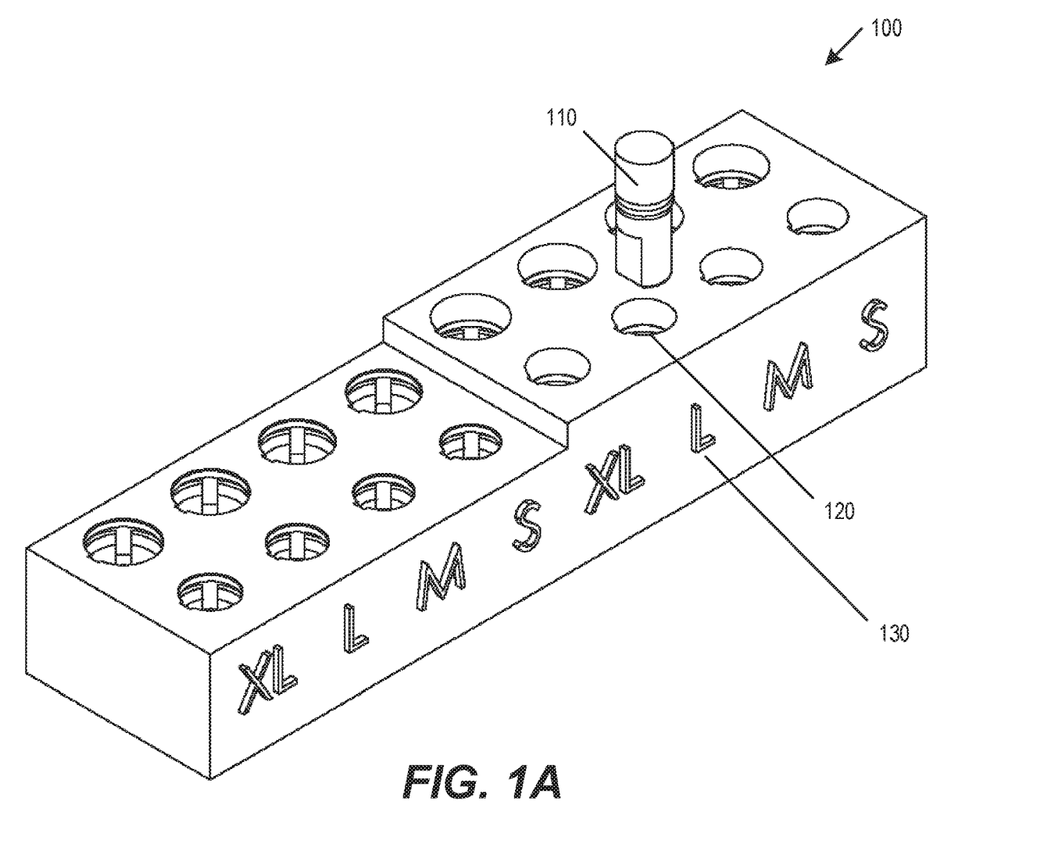
FIGS. 1A-1B are perspective and top views of an analog test block, in accordance with some embodiments.
Figure 1B:
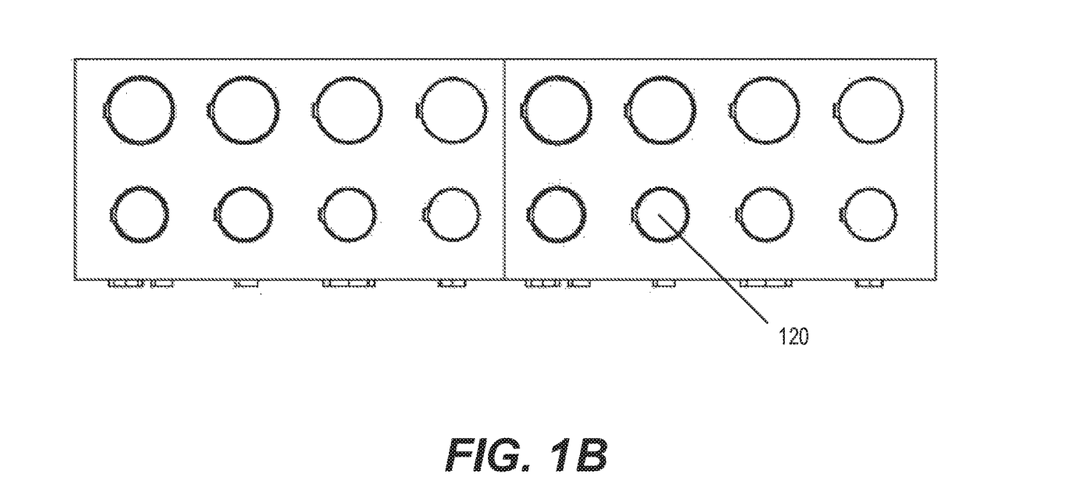

FIGS. 1A-1B are perspective and top views of an analog test block 100, in accordance with some embodiments. A dental analog 110 may be fitted within a plurality of analog pockets 120 within the test block 100 to identify the analog pocket that provides the best fit. Test block 100 may include one or more external labels 130 to provide a unique identification of the analog pocket 120. Once the best fitting analog pocket 120 is identified, the external label 130 may be used to identify a corresponding analog library file, and a dental prototype may be 3D-printed with one or more analog pockets based on this analog library file. By using a test block 100 that includes a plurality of analog pockets 120, many different analog pocket configurations may be tested quickly and without iteration to identify the analog pocket that provides the best fit, thereby reducing or avoiding the time-consuming process of printing multiple dental prototypes for dental analog fitting.

Test block 100 may include multiple rows and columns of analog pockets. The analog pockets may be arranged relative to each other by analog pocket diameter, by analog pocket height, by interior dental analog retention features, by analog pocket geometries, by analog pocket design schemes, or by other features. For example, the leftmost grouping of eight analog pockets shown in FIGS. 1A-2B may include a shorter analog pocket depth, and the rightmost group of analog pockets may include a longer analog pocket depth. Multiple rows of analog pockets may be used for differing analog pocket features. In an embodiment, the row of analog pockets closest to the external labels 130 may include a first dental analog retention mechanism, and the row of analog pockets furthest from the external labels 130 may include a second dental analog retention mechanism. While test block 100 shows sixteen analog pockets arranged in four groups of four analog pockets, different numbers and arrangements of analog pockets may be used.

A nominal dental analog geometry may be identified as a nominal pocket, and adjacent pockets may be increased by a predetermined tolerance value. In an embodiment, the predetermined tolerance value of 0.02 mm may be used to provide successively increasing or decreasing pocket diameters. Adjacent analog pockets and groups of analog pockets may be selected based on a type of 3D printing, a 3D printing resin material, or based on other printing parameters. There may be preferential analog geometries and digital libraries identified for particular combinations of 3D printer parameters, such as 3D printer type, 3D printing pattern, or 3D printing resin material. For example, while a fitting analog pocket may not be predicted accurately by a particular combination of 3D printer parameters, these 3D printer parameters may be used to determine a nominal analog geometry and predetermined tolerance values between adjacent analog pockets. The nominal analog geometry and predetermined tolerance values may be used to design the geometries and arrangement of the analog pockets within test block 100. The nominal analog geometry and predetermined tolerance values may also be used generate or identify an analog library file corresponding to each analog pocket, where the analog library file is used for printing of the dental prototype.

Figure 2:
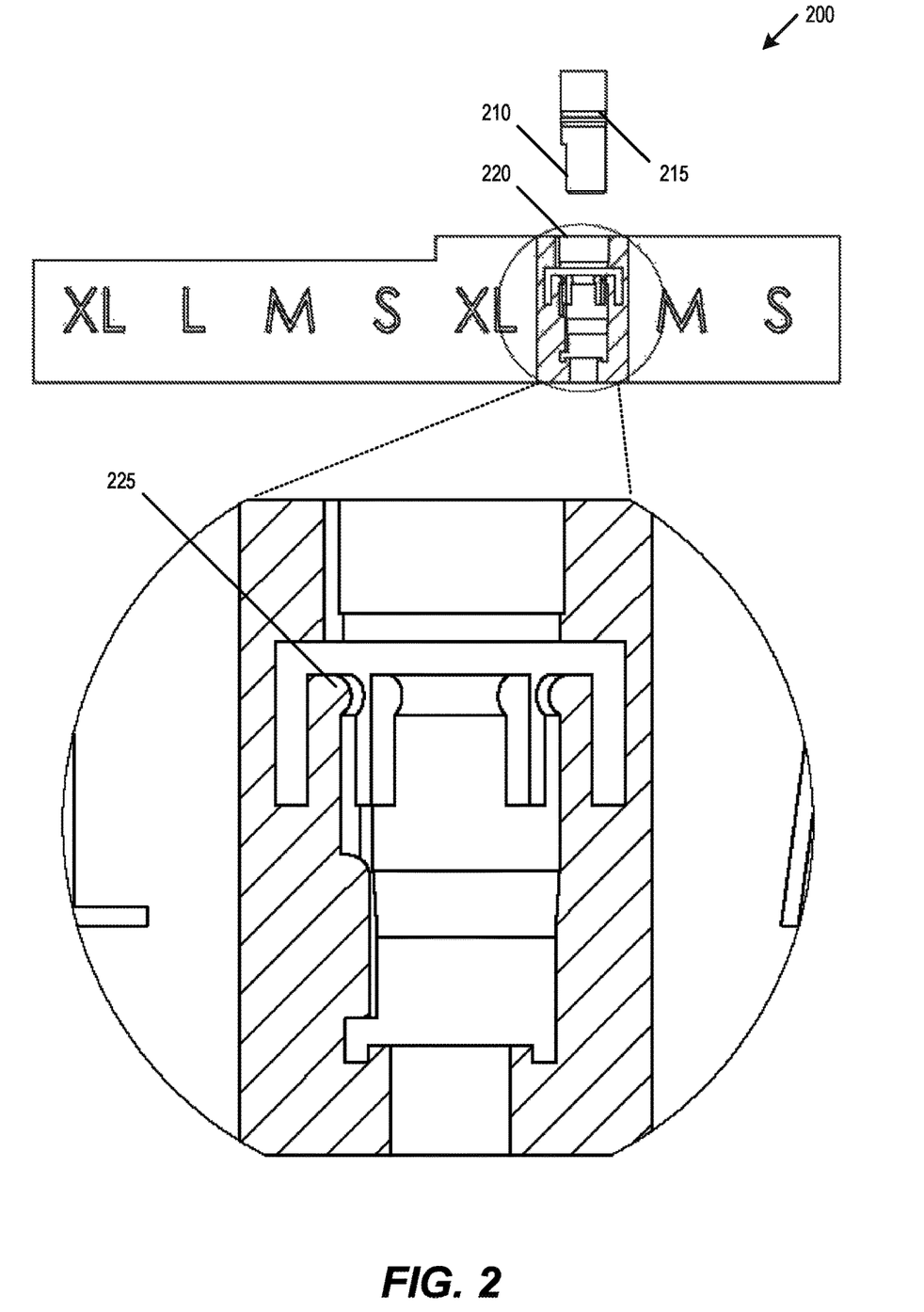
FIG. 2 is a first cutaway drawing of an analog test block, in accordance with some embodiments.

FIG. 2 is a first cutaway drawing of an analog test block 200, in accordance with some embodiments. In particular, FIG. 2 shows a dental analog 210 that is about to be inserted into an analog pocket 220 within test block 200. The dental analog 210 may include a retention mating mechanism 215 such as a ridge, which may mate with a corresponding dental analog retention mechanism 225 such as a detent mechanism. The analog pocket 220 may include other structures and mechanisms to improve fitting of the dental analog 210, such as to provide a friction fit, a lower mechanical interference, a lower analog fastener aperture, a tactile or audible fitting feedback, or other structure or mechanism.

Figure 3:
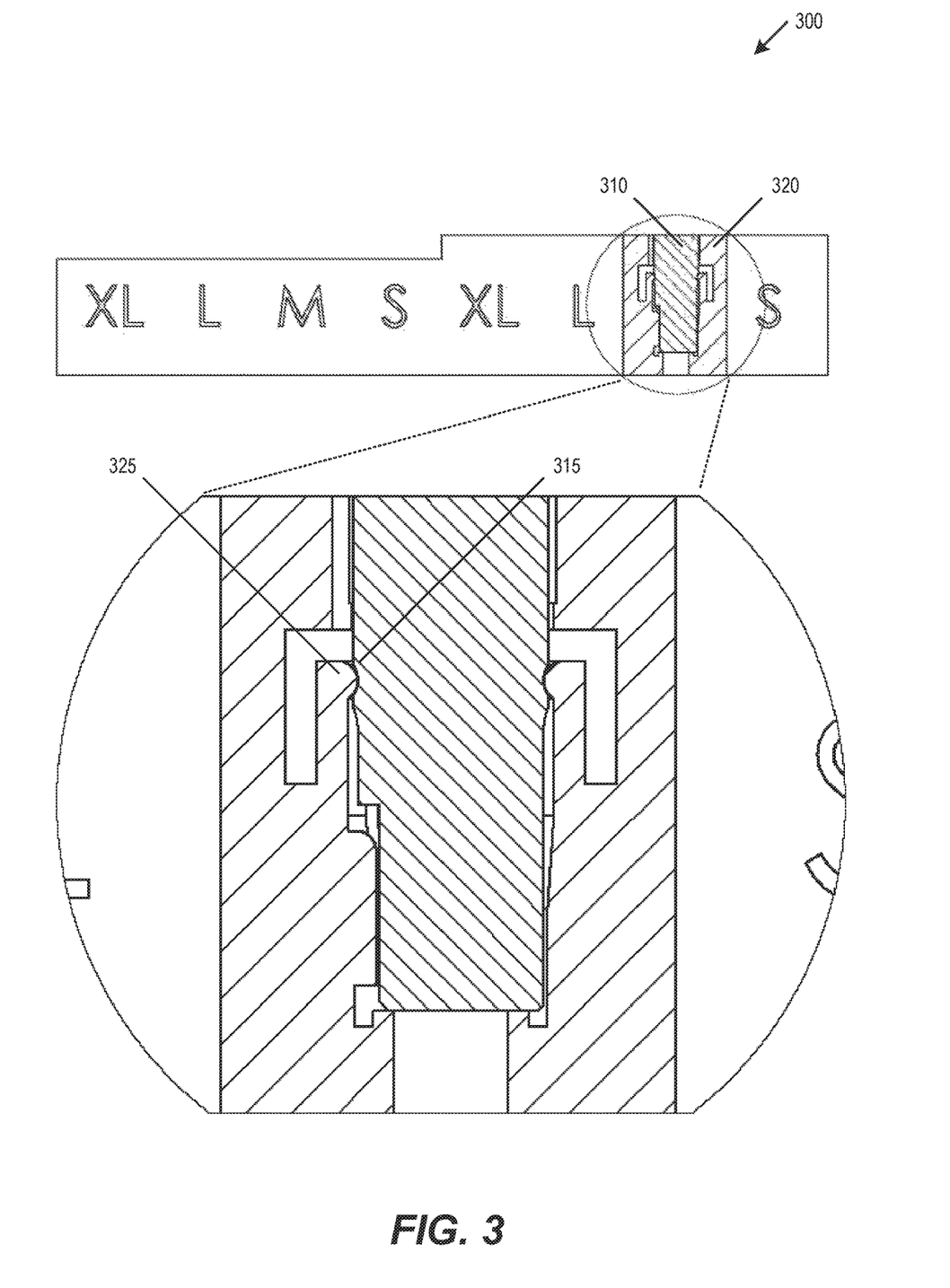
FIG. 3 is a second cutaway drawing of an analog test block, in accordance with some embodiments.

FIG. 3 is a second cutaway drawing of an analog test block 300, in accordance with some embodiments. In particular, FIG. 3 shows a dental analog 310 that has been inserted into an analog pocket 320 within test block 300. The dental analog 310 may include a retention mating mechanism 315 mated with a corresponding dental analog retention mechanism 325.

Figure 4:
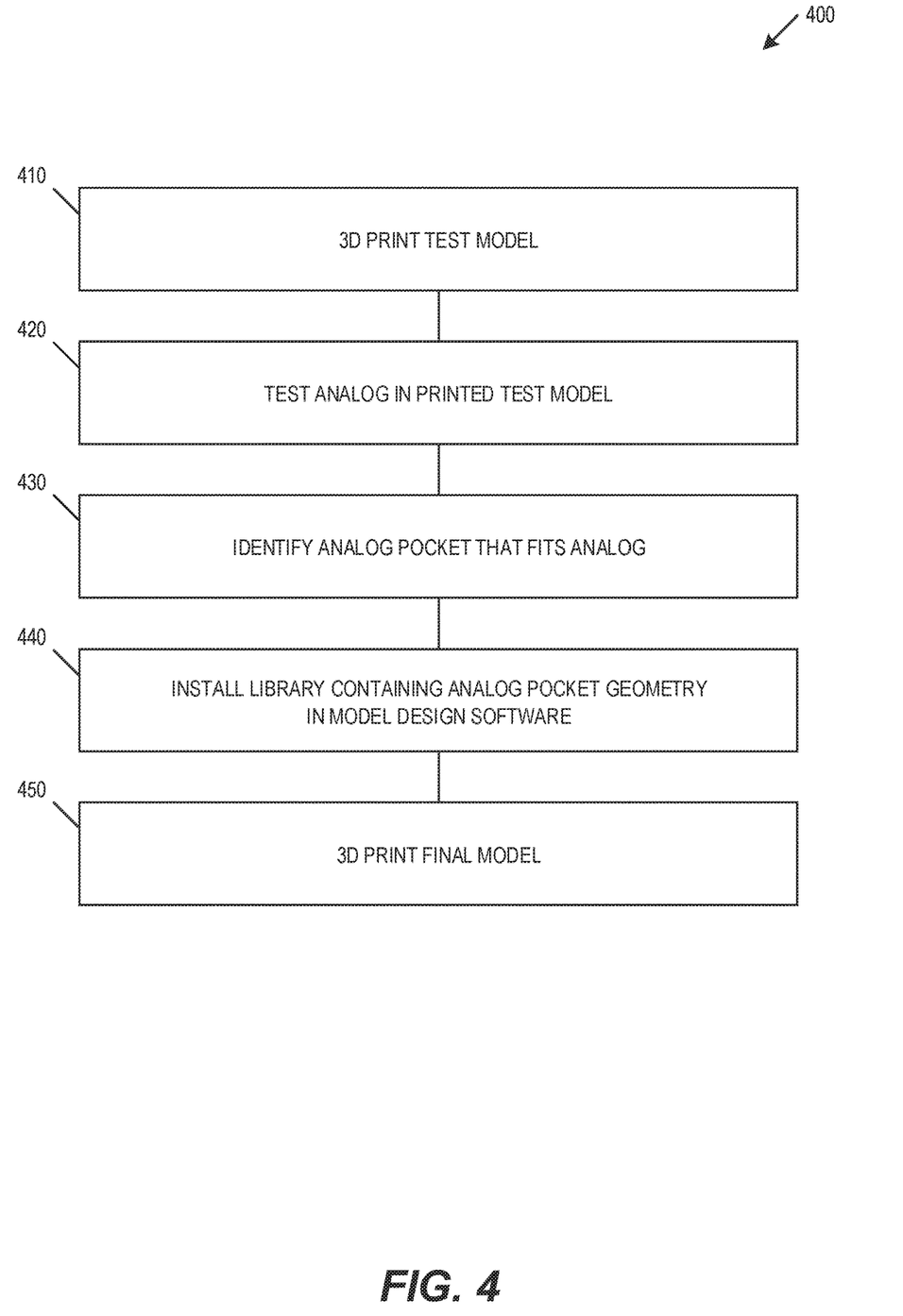
FIG. 4 illustrates a flow chart showing a dental analog technique, in accordance with some embodiments.

FIG. 4 illustrates a flow chart showing a dental analog technique 400, in accordance with some embodiments. In an embodiment, technique 400 includes 3D printing 410 a test model, where the test model includes a plurality of analog pockets. In an embodiment, the plurality of analog pockets may be arranged based on progressively increasing or decreasing geometric features, such as progressively increasing diameters. A dental analog is inserted 420 within various analog pockets within the test model, and an analog pocket is identified 430 as providing the best fit for the dental analog. Based on the identified analog pocket, an analog library file corresponding to the identified analog pocket is installed 440 in dental prototype modeling software. Using the analog library file, a final dental prototype model is 3D printed 450. To replicate the geometry of the best fitting dental analog, the same 3D printing parameters used to print the test model may be used to print the final dental prototype model.

Figure 5:
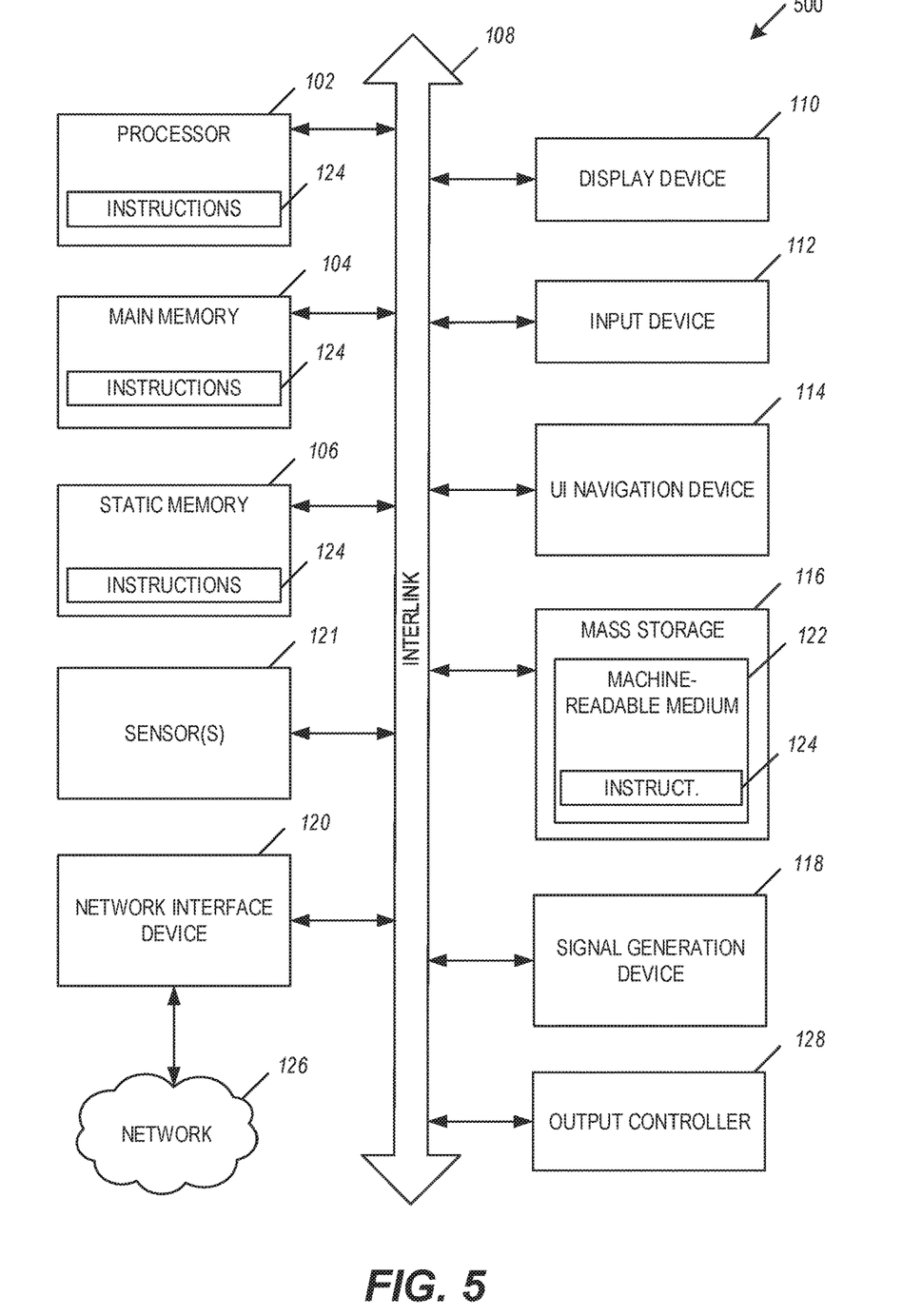
FIG. 5 illustrates generally an example of a block diagram of a machine upon which any one or more of the techniques (e.g., methodologies) discussed herein may perform in accordance with some embodiments.

FIG. 5 illustrates generally an example of a block diagram of a machine 500 upon which any one or more of the techniques (e.g., methodologies) discussed herein may perform in accordance with some embodiments. In alternative embodiments, the machine 500 may operate as a standalone device or may be connected (e.g., networked) to other machines. In a networked deployment, the machine 500 may operate in the capacity of a server machine, a client machine, or both in server-client network environments. The machine 500 may be a personal computer (PC), a tablet PC, a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or like mechanisms. Such mechanisms are tangible entities (e.g., hardware) capable of performing specified operations when operating. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. For example, under operation, the execution units may be configured by a first set of instructions to implement a first set of features at one point in time and reconfigured by a second set of instructions to implement a second set of features.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The display unit 510 may include goggles, glasses, an augmented reality (AR) display, a virtual reality (VR) display, or another display component. For example, the display unit may be worn on a head of a user and may provide a heads-up-display to the user. The alphanumeric input device 512 may include a virtual keyboard (e.g., a keyboard displayed virtually in a VR or AR setting.

The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices.

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, as the personal area network family of standards known as Bluetooth® that are promulgated by the Bluetooth Special Interest Group, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500, and includes digital or analog communications signals or other intangible medium to facilitate communication of such software.

Each of these non-limiting examples may stand on its own, or may be combined in various permutations or combinations with one or more of the other examples.

Example 1 is a dental analog method for generating a dental prototype model, the method comprising: inserting a dental analog within a plurality of analog pockets within a 3D-printed test model; identifying a preferred fitting analog pocket for the dental analog; identifying an analog library file corresponding to the preferred fitting analog pocket, the analog library file including an analog pocket geometry associated with the preferred fitting analog pocket; and 3D printing a final dental prototype model using analog pocket geometry based on the identified analog library file.

In Example 2, the subject matter of Example 1 optionally includes wherein each of the plurality of analog pockets includes a retention mechanism.

In Example 3, the subject matter of Example 2 optionally includes wherein the retention mechanism includes at least one of a detent mechanism, a friction fit geometry, a lower mechanical interference mechanism, and a lower analog fastener aperture.

In Example 4, the subject matter of any one or more of Examples 1-3 optionally include wherein each of the plurality of analog pockets includes a fitting feedback device to assist in the identification of the preferred fitting analog pocket.

In Example 5, the subject matter of any one or more of Examples 2-4 optionally include wherein the fitting feedback device includes at least one of a tactile feedback mechanism and an audible feedback mechanism.

In Example 6, the subject matter of any one or more of Examples 1-5 optionally include receiving a 3D printable model; 3D printing the 3D-printed test model based on the 3D printable model.

In Example 7, the subject matter of Example 6 optionally includes wherein 3D printing the 3D-printed test model includes printing a plurality of visual indicators, each of the plurality of visual indicators uniquely identifying each of the plurality of analog pockets.

In Example 8, the subject matter of any one or more of Examples 1-7 optionally include wherein the plurality of analog pockets is arranged based on progressively increasing geometric features.

In Example 9, the subject matter of any one or more of Examples 1-8 optionally include wherein the progressively increasing geometric features include progressively increasing diameters.

In Example 10, the subject matter of any one or more of Examples 1-9 optionally include receiving at least one 3D printer parameter, wherein 3D printing the test model and 3D printing the final dental prototype model are both based on the at least one 3D printer parameter.

In Example 11, the subject matter of Example 10 optionally includes identifying a nominal pocket geometry and analog pocket tolerance value based on the at least one 3D printer parameter.

In Example 12, the subject matter of any one or more of Examples 10-11 optionally include wherein the at least one 3D printer parameter includes at least one of a modified analog model, a 3D resin type, a 3D printing technique, and a 3D printer selection.

Example 13 is one or more machine-readable medium including instructions, which when executed by a computing system, cause the computing system to perform any of the methods of Examples 1-12.

Example 14 is an apparatus comprising means for performing any of the methods of Examples 1-12.

Example 15 is a system to perform the operations of any of the methods of Examples 1-12.

Example 16 is a dental analog device for generating a dental prototype model, the device comprising: a 3D-printed test model including a plurality of analog pockets, wherein: each of the plurality of analog pockets is configured to receive a dental analog to identify a preferred fitting analog pocket; each of the plurality of analog pockets is configured to uniquely identify an analog library file corresponding to the preferred fitting analog pocket, the analog library file including an analog pocket geometry associated with the preferred fitting analog pocket, the analog library file configured to be integrated into a 3D-printed final dental prototype model.

In Example 17, the subject matter of Example 16 optionally includes wherein each of the plurality of analog pockets includes a retention mechanism.

In Example 18, the subject matter of Example 17 optionally includes wherein the retention mechanism includes at least one of a detent mechanism, a friction fit geometry, a lower mechanical interference mechanism, and a lower analog fastener aperture.

In Example 19, the subject matter of any one or more of Examples 16-18 optionally include wherein each of the plurality of analog pockets includes a fitting feedback device to assist in the identification of the preferred fitting analog pocket.

In Example 20, the subject matter of any one or more of Examples 17-19 optionally include wherein the fitting feedback device includes at least one of a tactile feedback mechanism and an audible feedback mechanism.

In Example 21, the subject matter of any one or more of Examples 16-20 optionally include wherein the 3D-printed test model is based on a received 3D printable model.

In Example 22, the subject matter of any one or more of Examples 17-21 optionally include wherein the 3D-printed test model includes a plurality of printing visual indicators, each of the plurality of visual indicators uniquely identifying each of the plurality of analog pockets.

In Example 23, the subject matter of any one or more of Examples 16-22 optionally include wherein the plurality of analog pockets is arranged based on progressively increasing geometric features.

In Example 24, the subject matter of any one or more of Examples 16-23 optionally include wherein the progressively increasing geometric features include progressively increasing diameters.

In Example 25, the subject matter of any one or more of Examples 16-24 optionally include wherein the test model is based on a received 3D printer parameter.

In Example 26, the subject matter of Example 25 optionally includes wherein the 3D printer parameter identifies a nominal pocket geometry and analog pocket tolerance.

In Example 27, the subject matter of any one or more of Examples 25-26 optionally include wherein the at least one 3D printer parameter includes at least one of a modified analog model, a 3D resin type, a 3D printing technique, and a 3D printer selection.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A dental analog device for generating a dental prototype model, the dental analog device comprising:
   a 3D printed test model including a plurality of analog pockets, at least first and second analog pockets of the plurality of analog pockets having differing fitting tolerances with a selected dental analog, wherein:
   each of the plurality of analog pockets of the plurality of analog pockets is configured to receive the selected dental analog to identify a preferred fitting analog pocket;
   each of the plurality of analog pockets is configured to uniquely identify an analog library file corresponding to the preferred fitting analog pocket, the analog library file including a unique analog pocket geometry associated with the preferred fitting analog pocket; and
   the analog library file configured to be integrated into a 3D-printed final dental prototype model of a patient's jaw comprising an analog pocket based on the preferred fitting analog pocket, wherein the 3D printed test model and final dental prototype model are based on a common received 3D printer parameter such that a fit between the selected dental analog and the analog pocket in the dental prototype model is substantially the same as the fit between the selected dental analog and the preferred fitting analog pocket.

2. The device of claim 1, wherein the 3D-printed test model comprises a test block, wherein the plurality of analog pockets have different sizes, wherein the selected dental analog has different analog pocket tolerances when received by different ones of the plurality of analog pockets, and wherein the common received 3D printer parameter identifies a nominal pocket geometry and analog pocket tolerance for the analog pocket having the lowest analog pocket tolerance for the selected dental analog.

3. The device of claim 1, wherein each of the plurality of analog pockets comprises an orifice having an orifice dimension and the plurality of analog pockets having different orifice dimensions, wherein each of the plurality of analog pockets is associated with a different analog library file describing a geometry of a corresponding analog pocket, and wherein the preferred fitting analog pocket is associated with a best fit for the selected dental analog.

4. The device of claim 2, wherein 3D printing the test model and 3D printing the final dental prototype model are both based on the common received 3D printer parameter.

5. The device of claim 1, wherein the plurality of analog pockets have differing one or more of analog pocket diameter, analog pocket height, interior dental analog retention feature, analog pocket geometry, and analog pocket design.

6. The device of claim 5, wherein the plurality of analog pockets are arranged in one or more rows and columns based on the differing one or more of analog pocket diameter, analog pocket height, interior dental analog retention feature, analog pocket geometry, and analog pocket design.

7. The device of claim 1, wherein the 3D-printed test model is produced by a machine, comprising:
   a hardware processor;
   a non-transitory machine-readable medium in communication with the hardware processor comprising one or more sets of instructions that, when executed, cause the hardware processor to:
   receive a set of printer parameters;
   print, based on the set of printer parameters, the 3D-printed test model, wherein the plurality of analog pockets have a differing one or more of analog pocket diameters, analog pocket heights, interior dental analog retention features, analog pocket geometries, and analog pocket designs to accommodate different dental analogs having the differing one or more of analog pocket diameters, analog pocket heights, interior dental analog retention features, analog pocket geometries, and analog pocket designs, wherein each of the plurality of analog pockets corresponds to the uniquely identified analog library file, the uniquely identified analog library file describing the differing one or more of analog pocket diameters, analog pocket heights, interior dental analog retention features, analog pocket geometries, and analog pocket designs of the respective analog pocket;
   receive an identifier of one of the plurality of analog pockets that best fits a selected dental analog; and
   print, based on the set of printer parameters, a dental prototype model of a patient's jaw based on the uniquely identified analog library file corresponding to the best fitting one of the plurality of analog pockets associated with the identifier, wherein a fit between the selected dental analog and an analog pocket in the dental prototype model is substantially the same as the fit between the selected dental analog and the best fitting one of the plurality of analog pockets associated with the identifier.

8. The machine of claim 7, wherein the plurality of analog pockets have different sizes, wherein the selected dental analog has different analog pocket tolerances when received by different ones of the plurality of analog pockets, and wherein the set of printer parameters identifies a nominal pocket geometry and analog pocket tolerance for the analog pocket having the lowest analog pocket tolerance for the selected dental analog.

9. The machine of claim 7, wherein each of the plurality of analog pockets comprises an orifice having an orifice dimension and the plurality of analog pockets have different orifice dimensions, and wherein each of the plurality of analog pockets is associated with a different analog library file describing a geometry of a corresponding analog pocket.

10. The machine of claim 7, wherein the set of printer parameters identifies a nominal pocket geometry and analog pocket tolerance for the analog pocket having a lowest analog pocket tolerance for the selected dental analog and wherein printing the test model and printing the dental prototype model are both based on a common received printer parameter in the set of printer parameters.

11. The machine of claim 7, wherein the plurality of analog pockets have differing one or more of analog pocket diameters, analog pocket heights, interior dental analog retention features, and analog pocket geometries.

12. The machine of claim 11, wherein the plurality of analog pockets are arranged in one or more rows and columns based on the differing one or more of analog pocket diameters, analog pocket heights, interior dental analog retention features, analog pocket geometries, and analog pocket designs.

13. A non-transient computer readable medium comprising instructions for printing the 3D-printed test model of claim 1 that, when executed by a hardware processor, cause the hardware processor to:
   receive a set of printer parameters;
   provide the set of printer parameters to print the 3D-printed test model, wherein the plurality of analog pockets have a differing one or more of analog pocket diameters, analog pocket heights, interior dental analog retention features, analog pocket geometries, and analog pocket designs to accommodate different dental analogs having the differing one or more of analog pocket diameters, analog pocket heights, interior dental analog retention features, analog pocket geometries, and analog pocket designs, wherein each of the plurality of analog pockets corresponds to the uniquely identified analog library file, the uniquely identified analog library file describing the differing one or more of analog pocket diameters, analog pocket heights, interior dental analog retention features, analog pocket geometries, and analog pocket designs of the respective analog pocket;
   receive an identifier of one of the plurality of analog pockets that best fits a selected dental analog; and
   provide the set of printer parameters to print a dental prototype model of a patient's jaw based on the uniquely identified analog library file corresponding to the best fitting one of the plurality of analog pockets associated with the identifier, wherein a fit between the selected dental analog and an analog pocket in the dental prototype model is substantially the same as the fit between the selected dental analog and the best fitting one of the plurality of analog pockets associated with the identifier.

14. The non-transient computer readable medium of claim 13, wherein the plurality of analog pockets have different sizes, wherein the selected dental analog has different analog pocket tolerances when received by different ones of the plurality of analog pockets, and wherein the set of printer parameters identifies a nominal pocket geometry and analog pocket tolerance for the analog pocket having the lowest analog pocket tolerance for the selected dental analog.

15. The non-transient computer readable medium of claim 13, wherein each of the plurality of analog pockets comprises an orifice having an orifice dimension and the plurality of analog pockets have different orifice dimensions, and wherein each of the plurality of analog pockets is associated with a different analog library file describing a geometry of a corresponding analog pocket.

16. The non-transient computer readable medium of claim 13, wherein the set of printer parameter identifies a nominal pocket geometry and analog pocket tolerance for the analog pocket having a lowest analog pocket tolerance for the selected dental analog and wherein printing the test model and printing the dental prototype model are both based on a common received printer parameter in the set of printer parameters.

17. The non-transient computer readable medium of claim 13, wherein the plurality of analog pockets have differing one or more of analog pocket diameters, analog pocket heights, interior dental analog retention features, analog pocket geometries, and analog pocket designs.

18. The non-transient computer readable medium of claim 17, wherein the plurality of analog pockets are arranged in one or more rows and columns based on the differing one or more of analog pocket diameters, analog pocket heights, interior dental analog retention features, and analog pocket geometries.

* * * * *

UNITED STATES PATENT AND TRADEMARK OFFICE
CERTIFICATE OF CORRECTION

PATENT NO. : 12,038,803 B2
APPLICATION NO. : 16/829415
DATED : July 16, 2024
INVENTOR(S) : Andreas Geier and Zachary B. Suttin Page 1 of 1

It is certified that error appears in the above-identified patent and that said Letters Patent is hereby corrected as shown below:

In the Claims

Column 8, Line 35, Claim 1 after "each of the plurality of analog pockets" delete "of the plurality of analog pockets" therein.

Signed and Sealed this
Eighteenth Day of March, 2025

Coke Morgan Stewart
*Acting Director of the United States Patent and Trademark Office*